United States Patent
Nishikawa et al.

(10) Patent No.: US 7,720,118 B2
(45) Date of Patent: May 18, 2010

(54) LASER UNIT HAVING PREPARATORY FUNCTION FOR ACTIVATING THE UNIT AND ACTIVATION METHOD FOR THE UNIT

(75) Inventors: Yuji Nishikawa, Yamanashi (JP); Takafumi Murakami, Yamanashi (JP); Akihiko Nishio, Yamanashi (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 96 days.

(21) Appl. No.: 12/078,396

(22) Filed: Mar. 31, 2008

(65) Prior Publication Data

US 2008/0253416 A1 Oct. 16, 2008

(30) Foreign Application Priority Data

Apr. 10, 2007 (JP) ............................. 2007-102820

(51) Int. Cl.
*H01S 3/00* (2006.01)
(52) U.S. Cl. .................... 372/38.01; 372/38.09
(58) Field of Classification Search .................... 372/8, 372/38.01, 38.09
See application file for complete search history.

(56) References Cited

U.S. PATENT DOCUMENTS

| 6,266,352 | B1 | 7/2001 | Eguchi et al. |
| 7,257,136 | B2 | 8/2007 | Mori et al. |
| 2004/0258108 | A1* | 12/2004 | Iehisa ........................... 372/25 |
| 2007/0093688 | A1 | 4/2007 | Enomoto |

FOREIGN PATENT DOCUMENTS

| DE | 10 2006 050633 A1 | 5/2007 |
| EP | 0 419 671 A1 | 4/1991 |
| EP | 0 729 734 A | 9/1996 |
| EP | 1 681 750 A | 7/2006 |

(Continued)

OTHER PUBLICATIONS

Extended European Search Report mailed Jun. 23, 2008 issued in European Application No. 08 00 5779.7.

(Continued)

*Primary Examiner*—Armando Rodriguez
(74) *Attorney, Agent, or Firm*—Drinker Biddle & Reath LLP (57) ABSTRACT

A laser unit having a preparatory function for activating the unit and an activation method for the unit, capable of stabilizing the temperature of each component of the laser unit in the preparation stage when the laser unit is activated in a low-temperature or high-temperature environment, and then effectively judging completion of the preparation. During a period of time Ta from T1 to T2, a first trial of laser oscillation is performed. After a period of time Tb in which the laser is not oscillated, a second trial of laser oscillation from T3 to T4. Such an operation is repeated until a predetermined criterion is satisfied. Laser output values P2, P4, P6, . . . , at the last moment in each trial of laser oscillation are recorded. Then, each difference between the laser outputs at the last moments of two neighboring or continuous trials, is calculated. When the difference is lower than a predetermined criterion value, the preparation of the laser unit is judged to be completed.

6 Claims, 4 Drawing Sheets

FOREIGN PATENT DOCUMENTS

| | | |
|---|---|---|
| JP | 2-235588 | 9/1990 |
| JP | 02-294013 | 12/1990 |
| JP | 2002-319723 | 10/2002 |
| JP | 2005-251855 | 9/2005 |
| JP | 2006-088163 | 4/2006 |

OTHER PUBLICATIONS

Japanese Notice of Reasons for Rejection mailed Jul. 1, 2008 issued in Japanse Application No. 2007-102820 (including a partial translation thereof).

* cited by examiner

LASER UNIT HAVING PREPARATORY FUNCTION FOR ACTIVATING THE UNIT AND ACTIVATION METHOD FOR THE UNIT

RELATED APPLICATIONS

The present application claims priority from Japanese Patent Application No. 2007-102820, filed on Apr. 10, 2007, the entire contents of which are fully incorporated herein by reference.

BACKGROUND OF THE INVENTION

1. Field of the Invention

The present invention relates to a laser unit and an activation method therefor, in particular, a laser unit provided with a preparatory function for activating the unit an activating method therefor.

2. Description of the Related Art

In a laser oscillator, a laser performance such as a laser output, the stability of the laser output, a beam shape and/or a light-focusing power of the beam, and a detector performance such as the sensitivity of a laser output detector may be depend on the temperature of an oscillator, an excitation medium, cooling water, a laser power supply and/or the laser output detector. In other words, immediately after the laser oscillator is activated in a low-temperature or high-temperature environment, the performance of the laser beam and/or the laser output detector may be different from the performance while the temperature is stable. In this case, as the temperature of each component of the oscillator is changed by heat generated by laser oscillation or a cooling function provided to the oscillator, and then the oscillator approaches a thermal equilibrium state as time advances, the laser performance may become stable.

Therefore, when the laser oscillator is activated in a low-temperature or high-temperature environment, by thermally stabilizing the temperature of each component of the oscillator in a preparation stage before the laser is used, the laser output may be stable and laser machining may be stably performed. For example, Japanese Unexamined Patent Publication (Kokai) No. 2005-251855 discloses a method for measuring the temperature of a laser unit and judging whether the preparation of the laser unit is complete or not based on the measured temperature. Also, another method for measuring the laser output during laser oscillation and judging whether the preparation is complete based on the measured output, has been proposed.

However, by using only the temperature of the laser unit, completion of the preparation of the laser unit may not be correctly judged. Also, another method for judging completion of the preparation based on the laser output during laser oscillation, may be disadvantageous when the method uses a uniform criterion such as just a comparison between the laser output and a constant value. For example, in a laser oscillator having one or more components deteriorated by aging, and the performance of which is inferior to the design performance thereof, the laser output in a stable state (or the state in which the preparation is completed) is generally lower than that of the original oscillator. Therefore, the completion of the preparation in such a laser oscillator cannot be correctly judged by using the same criterion as before the aged deterioration.

SUMMARY OF THE INVENTION

An object of the present invention is to provide a laser unit having a function for stabilizing the temperature of each component of the laser unit in the preparation stage when the laser unit is activated in a low-temperature or high-temperature environment, and then effectively judging completion of the preparation, and an activation method of the laser unit.

Accordingly, one aspect of the invention provides a laser unit comprising: a laser oscillator; a laser power supply for supplying power to the laser oscillator; a laser output detector for measuring an laser output of the laser oscillator; a laser beam absorber for absorbing a laser beam; and a controller for controlling the laser oscillator, the laser power supply, the laser output detector and the laser beam absorber upon receiving a laser output command, wherein the controller includes: a trial conducting part for conducting, in a preparation process of the laser oscillator after the laser oscillator is activated and before the laser oscillator is ready to be stably used, a trial of laser oscillation in which the laser output detector measures the laser output after the laser oscillator oscillates a laser beam for a predetermined time, while the laser beam absorber absorbs at least a part of the oscillated laser beam; a judging part for judging, in the trial of laser oscillation by the trial conduction part, whether the laser output measured by the laser output detector satisfies a criterion predetermined based on a stable output condition of the laser unit; and an iteratively activating part for automatically alternating two states in which the trial conducting part conducts the trial of laser oscillation and the laser oscillator is suspended, until the judging part judges that the predetermined criterion is satisfied.

A preferable example of the predetermined criterion is that the difference, between two laser outputs measured in continuous two trials of laser oscillation, is equal to or smaller than a predetermined value.

Another preferable example of the predetermined criterion is that the difference, between the laser output measured in the trial of laser oscillation and a criterion laser output of the laser oscillator in a predetermined stable condition, is equal to or smaller than a predetermined value.

The laser unit may further comprise a temperature measurement device for measuring the temperature of at least one of the laser oscillator, the laser power supply, the laser output detector, a laser medium and cooling water for the laser oscillator. In this case, the controller may continue the trial of laser oscillation without alternating the two states by the iteratively activating part, until the temperature measured by the temperature measurement device is within a criterion temperature range predetermined based on the stable output condition of the laser unit.

A preferable example of the criterion temperature range is equal to or larger than a minimum criterion temperature predetermined based on the stable output condition of the laser unit.

An alternative or additional preferable example of the criterion temperature range is equal to or smaller than a maximum criterion temperature predetermined based on the stable output condition of the laser unit.

An alternative or additional preferable example of the criterion temperature range is a temperature range in which the laser output of the laser unit monotonically increases or decreases with time.

Also, another aspect of the invention provides a method for activating a laser unit including: a laser oscillator; a laser power supply for supplying power to the laser oscillator; a laser output detector for measuring an laser output of the laser oscillator; a laser beam absorber for absorbing laser beam; and a controller for controlling the laser oscillator, the laser power supply, the laser output detector and the laser beam absorber upon receiving a laser output command, wherein the method comprises the steps of: conducting, in a preparation process of the laser oscillator after the laser oscillator is activated and before the laser oscillator is ready to be stably used, a trial of laser oscillation in which the laser output detector measures the laser output after the laser oscillator oscillates a laser beam for a predetermined time, while the laser beam absorber absorbs at least a part of the oscillated laser beam; judging, in the trial of laser oscillation, whether the laser output measured by the laser output detector satisfies a criterion predetermined based on a stable output condition of the laser unit; and automatically alternating two states in which the trial of laser oscillation is conducted and the laser oscillator is suspended, until it is judged that the predetermined criterion is satisfied.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
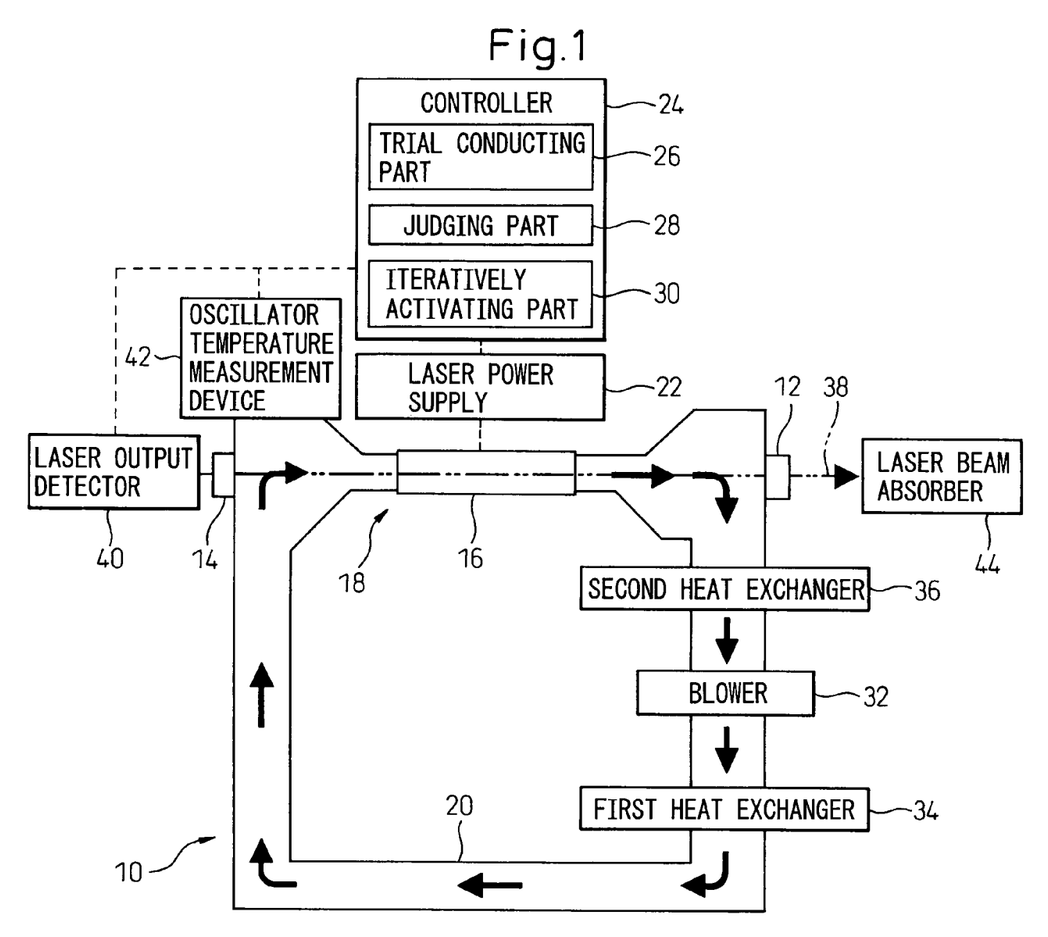
FIG. 1 shows a functional block diagram showing a basic configuration of a laser unit according to the present invention.

FIG. 1 shows a functional block diagram showing a basic configuration of a laser unit 10 according to the present invention. The laser unit 10 is illustrated as a gas-circulation-type laser unit. However, the invention may be applied to another laser unit such as a gas-sealed-type laser unit without circulating gas or a solid-state laser unit.

The laser unit 10 includes an output mirror 12, a rear mirror 14, a laser oscillator 18 having a discharge tube 16 positioned between the output mirror 12 and the rear mirror 14, a gas flow channel 20 fluidly communicated with the discharge tube 16, a laser power supply 22 for supplying electric power to the discharging tube 16, and a controller 24 for controlling the laser power supply 22, a laser output detector or measurement device 40 and a laser beam absorber or absorbing device 44. As described below, the controller 24 includes a trial conducting part 26 for conducting a trial of laser oscillation, a judging part 28 and for judging whether a predetermined criterion is satisfied, and an iteratively activating part 30.

A gas medium for laser oscillation including a laser medium such as carbon dioxide, nitrogen or argon gas (hereinafter, referred to as "laser gas") is fed by a blower 32 positioned in the gas flow channel 20, and cooled by a first heat exchanger 34. For example, the first heat exchanger 34 and a second heat exchanger 36 described below are configured to carry out heat exchange between the laser gas and cooling water. The laser gas within the flow channel 20 is introduced into the discharging tube 16. The laser gas is excited while flowing in the discharging tube 16, whereby a laser active state is generated. The discharging tube 16 may function as an excitation part for operating gas-discharge, otherwise, the discharging tube may be another type, such as using an optical or chemical reaction.

Light generated by the discharging tube 16 is amplified and oscillated between the output mirror 12 and the rear mirror 14, whereby a laser beam is generated. Since the output mirror 12 is a semitransparent mirror, the laser beam passing through the mirror 12 is outputted as an output laser beam 38. The laser gas flowing through the discharging tube 16 is cooled in the second heat exchanger 36, before returning to the blower 32.

The rear mirror 14 is also a semitransparent mirror, therefore, a part of the laser beam passing through the rear mirror 14 enters the laser output detector 40 such as a thermal sensor. The laser output detector 40 measures a laser output and sends information regarding the laser output to the controller 24. On the other hand, the temperature measurement device 42, constituted by a temperature sensor such as a thermocouple, measures the temperature of the oscillator (resonator) 18 and sends information regarding the temperature to the controller 24. The controller 24 may aggregate the information from various sensors such as the laser output detector 40 and the temperature measurement device 42, and control the operation of the laser power supply 22 based on a program. The temperature measurement device 42 may have a temperature switch function capable of sending a signal or the like to the controller 24 when the temperature of an object to be measured reaches a predetermined value. In addition, the blower and the heat exchanger are not essential in the invention.

The laser unit 10 of FIG. 1 has a laser beam absorber 44 for absorbing at least a part of the oscillated laser beam. In a preparation process, after the laser oscillator is activated and before the laser oscillator is ready to be stably used, a predetermined laser output command is applied to the controller 24 so as to oscillate a laser and at least a part of the oscillated laser is absorbed by the beam absorber 44. In this state, a trial of laser oscillation, in which the laser output of the oscillated laser is measured by the laser output detector 40 as described below, is performed.

The laser beam absorber 44 is configured to be moved between a first position on an optical path of the laser beam 38 (FIG. 1) and a second position offset from the optical path. Alternatively, at least a part of the laser beam may be introduced or reflected to the absorber 44 by means of a mirror configured to be moved between the first and second positions. Generally, while the laser beam 38 is absorbed by the beam absorber 44, the laser beam is not outputted outside the laser unit and is not used for laser processing.

Figure 2:
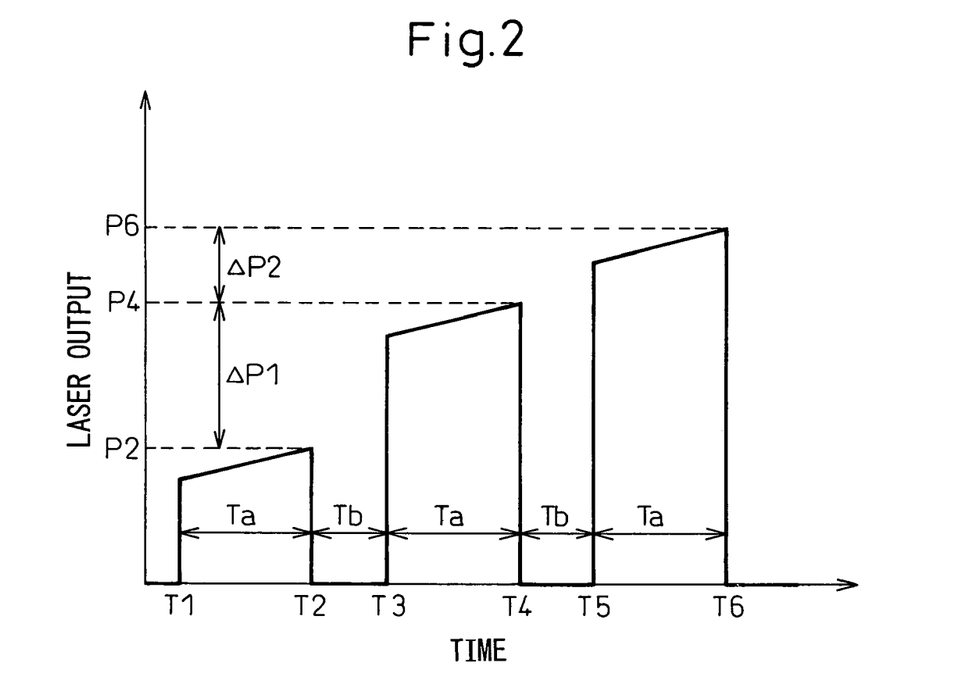
FIG. 2 is a graph explaining the relationship between a laser output and time when the laser unit is activated in a low-temperature environment.

Hereinafter, operations of the laser unit of FIG. 1, after the laser unit is activated and before the laser unit is ready to be stably used, are explained. FIG. 2 shows a relationship between time and a laser output when the laser unit is activated in a low-temperature state. At this point, the expression "low-temperature state" used herein means that the temperature of the laser oscillator is lower than the temperature thereof in a ready state that the laser oscillator may generate a laser beam having a stable output. In other words, the low-temperature state means a state which has not yet reached the ready state. In the illustrated example, during a period of time Ta from T1 to T2, the trial conducting part 26 conducts the above trial of laser oscillation. Next, after a period of time Tb in which the laser is not oscillated, a second trial of laser oscillation from T3 to T4, and a third trial of laser oscillation from T5 to T6 . . . are performed by the iteratively activating part 30 until the judging part 28 judges that a predetermined criterion as described below is satisfied. During each trial of laser oscillation, at least a part of the laser beam is absorbed by the above mentioned laser beam absorber. Generally, when the oscillator is activated at the low-temperature state, laser output is intended to increase with time.

The period of time Ta or the duration of each trial of laser oscillation and the period of time Tb or non-oscillation time between each trial may be respectively determined based on the characteristic of the laser oscillator, etc. For example, Ta and Tb may be set to from several tens of seconds to several minutes.

Laser output values P2, P4, P6, . . . , at the last moment in each trial of laser oscillation (i.e., times T2, T4, T6, . . . ), are recorded. Although it is not necessary to record the output at the last moment in each trial, it is preferable to use the output at the last moment since a most stable laser output in each trial may be used. Then, each difference $\Delta P1$ (=P4−P2), $\Delta P2$ (=P6−P4), . . . , $\Delta Pn$, between the laser outputs at the last moments of two neighboring or continuous trials, is calculated. When $\Delta Pn$ is lower than a predetermined criterion value, the judging part 28 judges that the preparation of the laser unit is completed and the laser unit may be suitably used. Generally, the laser unit approaches the stable output state in which the laser unit may generate a laser beam having a stable output, as the laser unit is warmed by laser oscillation. Therefore, the difference of laser output between continuous trials is gradually decreased. Accordingly, by monitoring $\Delta Pn$, the ready state, in which the laser output is stable, can be correctly judged. Although the criterion value may be varied depending on the type or the application of the laser unit, in general, the criterion value may be determined empirically.

Figure 3:
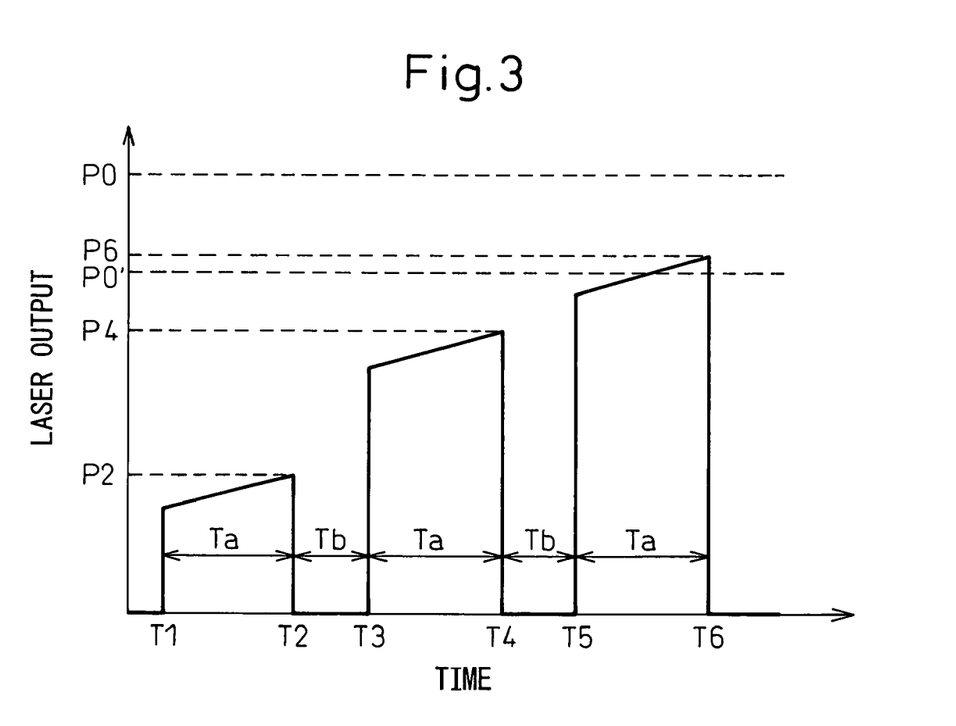
FIG. 3 is a graph, similar to FIG. 2, explaining a method for judging the completion of preparation of the laser unit by using a concept different from that in FIG. 2.

FIG. 3 is a graph, similar to FIG. 2, showing a relationship between time and a laser output when the laser unit is activated in a low-temperature state. However, in FIG. 3, the way for judging whether the laser output is stable is different from that of FIG. 2. First, a laser output P0, obtained when the temperature of the laser oscillator is within a criterion temperature range, is predetermined as a first criterion laser output. The criterion temperature range is determined, for example, based on empirical minimum and maximum criterion temperature defining the stable output state of the laser unit. Then, a second criterion laser output P0', which is a criterion for judging the ready state when the temperature of the oscillator is not within the above criterion temperature range. The difference between the first and second criterion laser output is within a predetermined range. In other words, the second criterion laser output means a level at which the laser unit does not reach the stable state but may be equivalent to the first criterion laser output in the light of the application or the purpose of the laser unit. Concretely, the second criterion laser output may be calculated by subtracting a certain positive value from the first criterion laser output, or by multiplying a certain positive value lower than one by the first criterion laser output. The ready state is judged when the laser output at the last moment in each trial of laser oscillation (P2, P4, P6, . . . ) first exceeds the second criterion laser output P0' thus calculated. In the illustrated example, since the third laser output P6 first exceeds the criterion P0', the laser unit is in the ready state after the third trail of laser oscillation.

The advantage of the method of FIG. 3 is that the ready state of the laser unit may be accurately judged even when the performance of the laser unit is lowered than a design performance thereof due to, for example, an aging deterioration of a component of the laser oscillator. This is because, as the above first criterion laser output P0 is lowered due to the aging deterioration, the second criterion laser output P0' is lowered accordingly.

Figure 4:
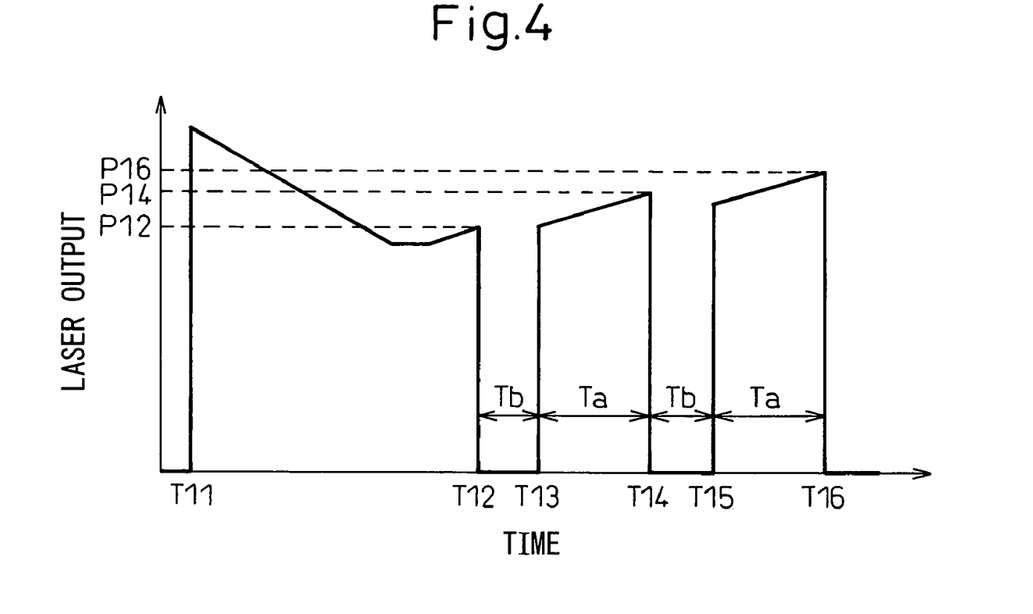
FIG. 4 is a graph explaining the relationship between the laser output and time when the laser unit is activated in a very-low-temperature environment.

Next, FIG. 4 is a graph showing a relationship between time and a laser output when the laser unit is activated in a very-low-temperature state. At this point, the expression "very-low-temperature state" used herein means that the temperature of the laser oscillator is close to the room temperature in a cold region or in the winter season (e.g., equal to or lower than 10° C.). In this case, the laser output is relatively high in the very-low-temperature state (at time T11), is gradually decreased with increase of temperature of the laser unit (i.e., the temperature approaches the above low-temperature), and is inversely increased as the laser unit approaches the ready state. Generally, the laser oscillator with the higher temperature may generate higher output of laser beam, on the other hand, the laser gas with the lower temperature may generate higher output of laser beam. Therefore, depending on a type, a laser unit may exhibit the characteristic as shown in FIG. 4. When the laser unit has the characteristic as shown in FIG. 4 (i.e., the laser output has a local minimum point in relation to time), the initial laser output at the very-low-temperature (at time T11) is relatively high. If the above method of FIGS. 2 and 3 is merely applied to such a case, the very-low-temperature state may be judged as the ready state, which may result in incorrect judgment of the ready state.

Then, it is effective to continue the above trial of laser oscillation without repeating each trial, until the temperature of the laser oscillator of the laser unit reach a criterion temperature predetermined based on the stable state of the laser unit, while monitoring the temperature of the oscillator. The criterion temperature may be set to the above minimum criterion temperature or the temperature on which the laser output may be empirically judged to exceed the local minimum point in relation to time. In the illustrated example, the temperature of the oscillator reaches the criterion temperature at time T12. After time T12 when the temperature of the oscillator exceeds the criterion temperature, the similar method of FIGS. 2 and 3 may be performed. In this method, the judgment of the ready state based on the laser output is not performed in the very-low-temperature state in which the laser output may be in the similar range to that of the stable state, whereby the ready state may be accurately judged. The advantage of this method is that the ready state may be correctly judged even when the relationship between the laser output and the temperature of the oscillator is complicated.

Instead of measuring or monitoring the temperature of the laser oscillator, the temperature of a component of the laser unit, for example, laser gas, cooling water used in the heat exchanger or the oscillator, the laser power supply or the laser output detector, may be measured or monitored so as to obtain the similar effect. The temperature of another component may be used, as long as the temperature of the component has a high correlation with the laser output, or, the laser output may be judged to exceed the local minimum point in relation to time (or to be in a monotonically increasing range) by using the temperature.

With reference to FIGS. 2 to 4, the activation of laser unit from the low- or very-low-temperature state is explained. However, depending on the installation environment of the laser unit, the laser unit may be activated in a high-temperature state in which the temperature of the laser unit is higher than that in the stable state thereof. The activation of the laser unit in this case is explained below with reference to FIGS. 5 and 6.

Figure 5:
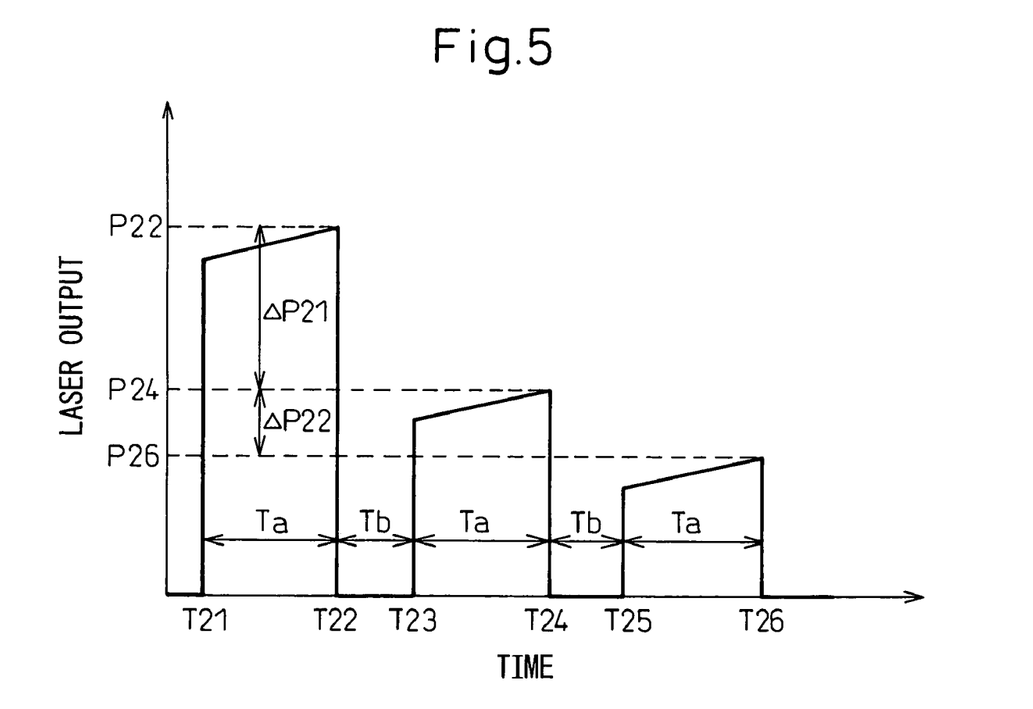
FIG. 5 is a graph explaining the relationship between the laser output and time when the laser unit is activated in a high-temperature environment.

FIG. 5 is a graph showing an example of operations when the laser unit is activated in the high-temperature state, by utilizing a method similar to FIG. 2. In the illustrated example, during a period of time Ta from T21 to T22, the trial conducting part 26 conducts the above trial of laser oscillation. Next, after a period of time Tb in which the laser is not oscillated, a second trial of laser oscillation from T23 to T24, and a third trial of laser oscillation from T25 to T26 . . . are performed by the iteratively activating part 30 until the judging part 28 judges that a predetermined criterion as described below is satisfied. During each trial of laser oscillation, at least a part of the laser beam is absorbed by the above mentioned laser beam absorber and is not used for laser machining, etc. Generally, when the oscillator is activated in the high-temperature state, the laser output is intended to decrease with time.

Laser output values P22, P24, P26, . . . , at the last moment in each trial of laser oscillation (i.e., times T22, T24, T26, . . . ), are recorded. Then, each difference ΔP21 (=P24−P22), ΔP22 (=P26−P24), . . . , ΔPn, between the laser outputs at the last moments of two neighboring or continuous trials, is calculated. When ΔPn is lower than a predetermined criterion value, the judging part 28 judges that the preparation of the laser unit is completed and the laser unit may be suitably used. Generally, the laser unit approaches the stable output state with time in which the laser unit may generate a laser beam having a stable output. Therefore, the difference of laser output between continuous trials is gradually decreased. Accordingly, by monitoring ΔPn, the ready state, in which the laser output is stable, can be correctly judged. Although the criterion value may be varied depending on the type or the application of the laser unit, in general, the criterion value may be determined empirically.

Figure 6:
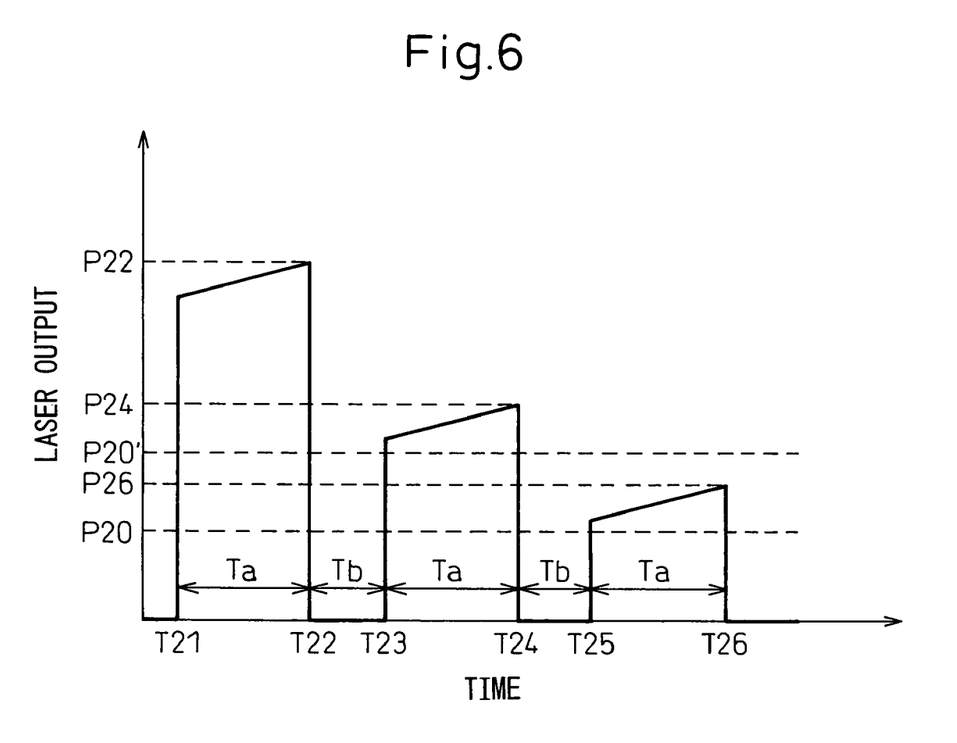
FIG. 6 is a graph, similar to FIG. 5, explaining a method for judging the completion of preparation of the laser unit by using a concept different from that in FIG. 5.

FIG. 6 is a graph, similar to FIG. 5, showing a relationship between time and a laser output when the laser unit is activated in a high-temperature state. However, in FIG. 6, the way for judging whether the laser output is stable is similar to that of FIG. 3. First, a laser output P20, obtained when the temperature of the laser oscillator is within a criterion temperature range, is predetermined as a first criterion laser output. The criterion temperature range is determined, for example, based on empirical minimum and maximum criterion temperature defining the stable output state of the laser unit. Then, a second criterion laser output P20', which is a criterion for judging the ready state when the temperature of the oscillator is not within the above criterion temperature range. The difference between the first and second criterion laser output is within a predetermined range. In other words, the second criterion laser output means a level at which the laser unit does not reach the stable state but may be equivalent to the first criterion laser output in the light of the application or the purpose of the laser unit. Concretely, the second criterion laser output P20' may be calculated by adding a certain positive value to the first criterion laser output P20, or by multiplying a certain positive value higher than one by the first criterion laser output. The ready state is judged when the laser output at the last moment in each trial of laser oscillation (P22, P24, P26, . . . ) first falls below the second criterion laser output P20' thus calculated. In the illustrated example, since the third laser output P26 first falls below the criterion P20', the laser unit is in the ready state after the third trail of laser oscillation.

Also when the laser unit is activated in the high-temperature state, the relationship between the laser output and the temperature of the oscillator may be complicated due to the thermal strain or the like of the laser oscillator. However, by setting the criterion temperature of the oscillator or another component to the above maximum criterion temperature or the temperature on which the laser output may be empirically judged to be in a monotonically changing range, the ready state of the laser unit may be accurately judged.

According to the present invention, the trial of laser oscillation may be repeatedly performed automatically and effectively, until the laser unit activated in the low- or high-temperature state reaches the ready state, in order to allow the laser unit to approach the stable state such as a thermal equilibrium state. By determining the criterion based on the stable state of the laser output, the ready state may be suitably judged even when the performance of the laser unit is somewhat deteriorated, because the stable state is changed according to the aging deterioration of the oscillator or the other component of the laser unit.

The concrete criterion may be simply determined, for example, as the difference between two laser outputs of two continuous trials of laser oscillation. Otherwise, the criterion may be that the difference between a predetermined criterion laser output in the stable state and the laser output in each trial is lower than a certain value.

By measuring the temperature of at least one of the laser oscillator, the laser medium, cooling water, the laser power supply and the laser output detector, and by continuing the trial of laser oscillation without repeating each trial until the measured temperature reaches the criterion temperature determined based on the stable state of the laser unit, it may be avoided to judge the state such as the very-low-temperature, in which the laser unit is not in the ready state but the laser output is similar to that in the stable state, as the ready state.

By setting the concrete range of the criterion temperature to "equal to or higher than the minimum criterion temperature" or "equal to or lower than the maximum criterion temperature" predetermined based on the stable state of the laser unit, the trial of laser oscillation may be started form the state which is very close to the stable state. On the other hand, by setting the criterion temperature range to a temperature range in which the laser output monotonically increases or decreases with time, the trial may be started earlier, whereby a startup time of the laser unit may be reduced.

While the invention has been described with reference to specific embodiments chosen for the purpose of illustration, it should be apparent that numerous modifications could be made thereto, by one skilled in the art, without departing from the basic concept and scope of the invention.

The invention claimed is:
1. A laser unit comprising:
a laser oscillator;
a laser power supply for supplying power to the laser oscillator;
a laser output detector for measuring a laser output of the laser oscillator;
a laser beam absorber for absorbing laser beam; and
a controller for controlling the laser oscillator, the laser power supply, the laser output detector and the laser beam absorber upon receiving a laser output command,
wherein the controller includes:
a trial conducting part for conducting, in a preparation process of the laser oscillator after the laser oscillator is activated and before the laser oscillator is ready to be stably used, a trial of laser oscillation in which the laser output detector measures the laser output after the laser oscillator oscillates a laser beam for a predetermined time, while the laser beam absorber absorbs at least a part of the oscillated laser beam;
a judging part for judging, in the trial of laser oscillation by the trial conducting part, whether the laser output measured by the laser output detector satisfies a criterion predetermined based on a stable output condition of the laser unit; and an iteratively activating part for automatically alternating two states in which the trial conducting part conducts the trial of laser oscillation and the laser oscillator is suspended, until the judging part judges that the predetermined criterion is satisfied, wherein the predetermined criterion is that the difference, between two laser outputs measured in continuous two trials of laser oscillation, is equal to or smaller than a predetermined value.

2. A laser unit comprising:

a laser oscillator;

a laser power supply for supplying power to the laser oscillator;

a laser output detector for measuring a laser output of the laser oscillator;

a laser beam absorber for absorbing laser beam; and a controller for controlling the laser oscillator, the laser power supply, the laser output detector and the laser beam absorber upon receiving a laser output command, wherein the controller includes:

a trial conducting part for conducting, in a preparation process of the laser oscillator after the laser oscillator is activated and before the laser oscillator is ready to be stably used, a trial of laser oscillation in which the laser output detector measures the laser output after the laser oscillator oscillates a laser beam for a predetermined time, while the laser beam absorber absorbs at least a part of the oscillated laser beam;

a judging part for judging, in the trial of laser oscillation by the trial conducting part, whether the laser output measured by the laser output detector satisfies a criterion predetermined based on a stable output condition of the laser unit; and an iteratively activating part for automatically alternating two states in which the trial conducting part conducts the trial of laser oscillation and the laser oscillator is suspended, until the judging part judges that the predetermined criterion is satisfied, wherein the predetermined criterion is that the difference, between the laser output measured in the trial of laser oscillation and a criterion laser output of the laser oscillator in a predetermined stable condition, is equal to or smaller than a predetermined value.

3. A laser unit comprising:

a laser oscillator;

a laser power supply for supplying power to the laser oscillator;

a laser output detector for measuring a laser output of the laser oscillator;

a laser beam absorber for absorbing laser beam; and a controller for controlling the laser oscillator, the laser power supply, the laser output detector and the laser beam absorber upon receiving a laser output command, wherein the controller includes:

a trial conducting part for conducting, in a preparation process of the laser oscillator after the laser oscillator is activated and before the laser oscillator is ready to be stably used, a trial of laser oscillation in which the laser output detector measures the laser output after the laser oscillator oscillates a laser beam for a predetermined time, while the laser beam absorber absorbs at least a part of the oscillated laser beam;

a judging part for judging, in the trial of laser oscillation by the trial conducting part, whether the laser output measured by the laser output detector satisfies a criterion predetermined based on a stable output condition of the laser unit; and an iteratively activating part for automatically alternating two states in which the trial conducting part conducts the trial of laser oscillation and the laser oscillator is suspended, until the judging part judges that the predetermined criterion is satisfied, the laser unit further comprising a temperature measurement device for measuring the temperature of at least one of the laser oscillator, the laser power supply, the laser output detector, a laser medium and cooling water for the laser oscillator, wherein the controller continues the trial of laser oscillation without alternating the two states by the iteratively activating part, until the temperature measured by the temperature measurement device is within a criterion temperature range predetermined based on the stable output condition of the laser unit.

4. The laser unit as set forth in claim 3, wherein the criterion temperature range is equal to or larger than a minimum criterion temperature predetermined based on the stable output condition of the laser unit.

5. The laser unit as set forth in claim 3, wherein the criterion temperature range is equal to or smaller than a maximum criterion temperature predetermined based on the stable output condition of the laser unit.

6. The laser unit as set forth in claim 3, wherein the criterion temperature range is a temperature range in which the laser output of the laser unit monotonically increases or decreases with time.

* * * * *